United States Patent
Shan et al.

(10) Patent No.: US 12,542,748 B2
(45) Date of Patent: Feb. 3, 2026

(54) ROUTING NODE SCHEDULING METHOD FOR NETWORK ON CHIP (NOC) IN FIELD PROGRAMMABLE GATE ARRAY (FPGA)

(71) Applicant: WUXI ESIONTECH CO., LTD., Wuxi (CN)

(72) Inventors: Yueer Shan, Wuxi (CN); Yanfeng Xu, Wuxi (CN); Jicong Fan, Wuxi (CN); Zhenkai Ji, Wuxi (CN)

(73) Assignee: WUXI ESIONTECH CO., LTD., Wuxi (CN)

( * ) Notice: Subject to any disclaimer, the term of this patent is extended or adjusted under 35 U.S.C. 154(b) by 389 days.

(21) Appl. No.: 18/348,385

(22) Filed: Jul. 7, 2023

(65) Prior Publication Data
US 2023/0353500 A1 Nov. 2, 2023

Related U.S. Application Data

(63) Continuation of application No. PCT/CN2023/083018, filed on Mar. 22, 2023.

(30) Foreign Application Priority Data

Jun. 24, 2022 (CN) .......................... 202210722813.6

(51) Int. Cl.
*H04L 47/625* (2022.01)
(52) U.S. Cl.
CPC ................... *H04L 47/625* (2013.01)
(58) Field of Classification Search
CPC .................................................. H04L 47/625
(Continued)

(56) References Cited

U.S. PATENT DOCUMENTS

| 7,274,692 B1 | 9/2007 | Hughes |
| 11,496,418 B1 * | 11/2022 | Blair ....................... H04L 49/15 |

(Continued)

FOREIGN PATENT DOCUMENTS

| CN | 101146091 A | 3/2008 |
| CN | 101383712 A | 3/2009 |

(Continued)

OTHER PUBLICATIONS

Xu Zhi-Sheng, The Design to Dynamic Weight Arbitrator Based on Network-on-Chip, J. Changchun Inst. Tech. (Nat. Sci. Edi.), 2019, pp. 55-58, vol. 20 No. 4.

(Continued)

*Primary Examiner* — Faisal Choudhury
(74) *Attorney, Agent, or Firm* — Bayramoglu Law Offices LLC

(57) ABSTRACT

A routing node scheduling method for an NOC in an FPGA is used when a plurality of input ports each have a data packet to be transmitted to a routing node at the same time. A scheduling controller within the routing node is used to enable each input port according to a predetermined scheduling order, and the routing node receives a data packet through the enabled input port. In addition, quantities of times at least two input ports are enabled are different in one scheduling cycle, which means that the scheduling controller implements biased scheduling control over each input port, allowing different input ports to transmit data packets at different frequencies. This can increase a quantity of times an input port with high communication importance is enabled, making a data packet at the input port be transmitted more timely and achieving better transmission efficiency. The scheduling method can well match transmission requirements of different services to achieve optimal transmission performance of an NOC.

11 Claims, 2 Drawing Sheets

(58) Field of Classification Search
USPC .......................................................... 370/412
See application file for complete search history.

(56) References Cited

U.S. PATENT DOCUMENTS

| | | |
|---|---|---|
| 2003/0174701 A1 | 9/2003 | Angle et al. |
| 2008/0205432 A1 | 8/2008 | Gangwal |
| 2012/0002675 A1 | 1/2012 | Kauschke et al. |
| 2016/0142331 A1 | 5/2016 | Daniel et al. |
| 2020/0014658 A1* | 1/2020 | Inazu ................... H04L 12/467 |
| 2020/0267044 A1* | 8/2020 | Hartley ................. H04L 12/462 |
| 2023/0224261 A1* | 7/2023 | Pope ................... G06F 13/4022 370/392 |
| 2023/0412519 A1* | 12/2023 | Mula ...................... H04L 43/16 |

FOREIGN PATENT DOCUMENTS

| | | |
|---|---|---|
| CN | 102810082 A | 12/2012 |
| CN | 106330710 A | 1/2017 |
| CN | 106603420 A | 4/2017 |
| CN | 210093238 U | 2/2020 |
| CN | 110875828 A | 3/2020 |
| CN | 112073230 A | 12/2020 |
| CN | 114024796 A | 2/2022 |
| CN | 115118677 A | 9/2022 |
| WO | 2016177058 A1 | 11/2016 |
| WO | 2020043161 A1 | 3/2020 |

OTHER PUBLICATIONS

Guan Zheng, et al., On-chip Network Router Arbitration Control with QoS Support, Computer Science, 2015, pp. 55-59, vol. 42 No. 2.

Wu Chang, et al., Design of a Customized Arbitral Priority NOC Router, Journal of University of Electronic Science and Technology of China, 2008, pp. 645-648, vol. 37 No. 5.

* cited by examiner

ROUTING NODE SCHEDULING METHOD FOR NETWORK ON CHIP (NOC) IN FIELD PROGRAMMABLE GATE ARRAY (FPGA)

CROSS REFERENCE TO THE RELATED APPLICATIONS

This application is a continuation application of International Application No. PCT/CN2023/083018, filed on Mar. 22, 2023, which is based upon and claims priority to Chinese Patent Application No. 202210722813.6, filed on Jun. 24, 2022, the entire contents of which are incorporated herein by reference.

TECHNICAL FIELD

The present disclosure relates to the technical field of field programmable gate arrays (FPGAs), and in particular, to a routing node scheduling method for a network on chip (NOC) in an FPGA.

BACKGROUND

An FPGA is widely used in mobile communication, data centers, automatic driving, aerospace, and other fields. New applications require increasingly high bandwidth, storage and data capabilities of the FPGA. Therefore, in more approaches, an NOC is integrated within the FPGA to optimize communication performance.

The NOC is formed by interconnecting a large quantity of routing nodes based on a network architecture. Each routing node contains a plurality of input ports and output ports. Path interconnection between different input ports and output ports can be achieved through an internal switch interconnection array. As a key component of the NOC, the routing node is responsible for service forwarding between various IP cores within the FPGA. The plurality of input ports of the routing node have a plurality of different services to process, so the routing node needs to schedule the different services. A common traditional approach is to loop through and process services from the input ports, which is characterized by a relatively single scheduling method and often affects service performance.

SUMMARY

Technical Problems

In a common traditional approach, when scheduling different services, a routing node loops through and processes services from various input ports, which is characterized by a relatively single scheduling method and often affects service performance.

Technical Solutions

To resolve the above problems and meet the above technical requirements, the inventor of the present disclosure proposes a routing node scheduling method for an NOC in an FPGA. The technical solutions of the present disclosure are as follows:

A routing node scheduling method for an NOC in an FPGA is provided, where a routing node in an NOC includes a scheduling controller, and a method executed by the scheduling controller includes: in a scheduling cycle, enabling, by the scheduling controller, each input port of the routing node sequentially according to a predetermined scheduling order, where at most one input port is enabled at each time point; and receiving, by the routing node, a data packet through the enabled input port, where quantities of times at least two input ports are enabled are different in one scheduling cycle.

As a further technical solution, higher communication importance of the input port leads to a larger quantity of times the input port is enabled in one scheduling cycle, and communication importance of the input port is related to a functional module connected to the input port and/or information transmitted by the input port.

As a further technical solution, the communication importance of the input port is related to at least one of a type, a transmission rate, a throughput, a load, and a latency requirement of the information transmitted by the input port.

As a further technical solution, predetermined scheduling orders followed by the scheduling controller within one routing node in two adjacent scheduling cycles are the same or different.

As a further technical solution, the scheduling controller updates the predetermined scheduling order online based on a dynamic reconfigurable function of the FPGA.

As a further technical solution, biased input ports within different routing nodes in the NOC are located on a same signal transmission path in the FPGA, and a biased input port within each routing node is an input port with a non-smallest quantity of enabling times within the routing node.

As a further technical solution, each input port of the routing node is enabled at least once in one scheduling cycle, or at least one input port of the routing node is never enabled in the scheduling cycle.

As a further technical solution, after the routing node completes data packet reception through a currently enabled $i^{th}$ input port, when the scheduling controller detects a valid feedback signal of an $(i+1)^{th}$ input port, the scheduling controller enables the $(i+1)^{th}$ input port, and the routing node receives a data packet through the enabled $(i+1)^{th}$ input port; when the scheduling controller detects an invalid feedback signal of the $(i+1)^{th}$ input port, the scheduling controller skips the $(i+1)^{th}$ input port and detects a feedback signal of an $(i+2)^{th}$ input port, where the $(i+1)^{th}$ input port is a next input port of the $i^{th}$ input port in the predetermined scheduling order, the $(i+2)^{th}$ input port is a next input port of the $(i+1)^{th}$ input port in the predetermined scheduling order, the valid feedback signal is a feedback signal when there is a data packet to be transmitted at the input port, and the invalid feedback signal is a feedback signal when there is no data packet to be transmitted at the input port.

As a further technical solution, the routing node internally includes a built-in memory, and when detecting that the built-in memory is not full, the scheduling controller enables a next input port according to the predetermined scheduling order to receive a data packet; or when detecting that the built-in memory is full, the scheduling controller pauses enabling of any input port, and enables a next input port according to the predetermined scheduling order to receive a data packet when the built-in memory has a remaining storage capacity.

As a further technical solution, the routing node receives one data packet through the enabled input port and stores the data packet in the built-in memory, or the routing node receives a plurality of data packets through the enabled input port under a constraint of the remaining storage capacity of the built-in memory and stores the plurality of data packets in the built-in memory.

As a further technical solution, built-in memories within any two routing nodes in the NOC have a same capacity or different capacities.

As a further technical solution, the routing node further includes a shift register, and the scheduling controller connects and controls the shift register to output a shift control signal including Q control bits, each of the control bits corresponds to one input port, and one input port corresponds to at least one control bit; a quantity of control bits corresponding to one input port is positively correlated with a quantity of times the input port is enabled in one scheduling cycle, and an order of a control bit corresponding to one input port in all the Q control bits matches the predetermined scheduling order; one control bit uniquely corresponding to one input port is directly output as an enabling signal of the input port; and a plurality of control bits corresponding to a same input port are used as an enabling signal of the corresponding input port after undergoing OR processing.

Beneficial Effects

The present disclosure provides a routing node scheduling method for an NOC in an FPGA. The method is used when a plurality of input ports each have a data packet to be transmitted to a routing node at the same time. A scheduling controller within the routing node performs tendentious scheduling control over each input port according to a predetermined scheduling order, allowing different input ports to transmit data packets at different frequencies. This can increase a quantity of times an input port with high communication importance is enabled, making a data packet at the input port be transmitted more timely and achieving better transmission efficiency. The scheduling method can well match transmission requirements of different services to achieve optimal transmission performance of an NOC.

In addition, the routing node scheduling method can be easily implemented by programmable logic, and can adjust the predetermined scheduling order online in combination with a dynamic reconfigurable function of the FPGA, without disconnecting the network. The adjustment method is simple, and can also dynamically meet transmission requirements of different scenarios in a working process of the FPGA.

DETAILED DESCRIPTION OF THE EMBODIMENTS

Specific implementations of the present disclosure will be further described with reference to the accompanying drawings.

Figure 1:
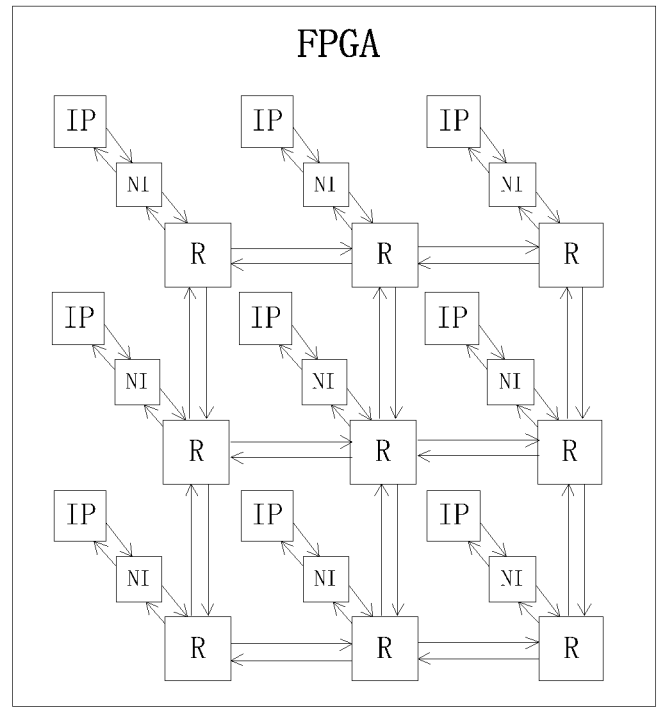
FIG. 1 is a schematic diagram of a common network structure of an NOC.

The present disclosure provides a routing node scheduling method for an NOC in an FPGA. FIG. 1 is a schematic diagram of an NOC in a common FPGA. The NOC includes a plurality of NOC nodes. In FIG. 1, an example in which the NOC includes nine NOC nodes is used for description. Each NOC node includes routing node R, a network interface (NI) connected to the routing node R, and functional module IP in the FPGA. Each routing node R includes a plurality of input ports and output ports, and different NOC nodes are connected by using input and output ports of respective routing nodes R of these NOC nodes.

Figure 2:
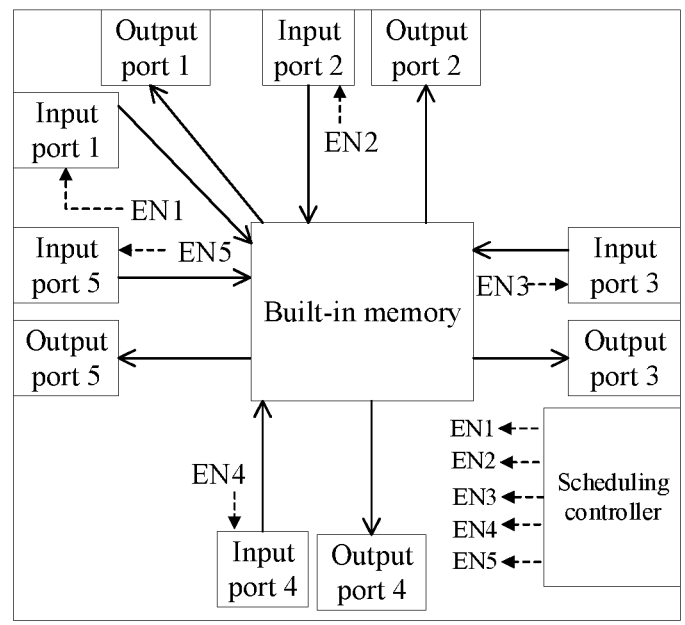
FIG. 2 is a schematic diagram of an internal structure of a routing node according to an embodiment.

Regardless of a specific structure of the NOC, the routing node R is an important component of the NOC to realize information interconnection and routing, and each routing node includes the plurality of input/output ports for connecting to other routing nodes in different directions. For example, FIG. 2 is a schematic structural diagram of a routing node. The routing node includes five groups of inputs and outputs, and each group of input and output includes an input port and an output port respectively. Input port 1 and output port 1 are configured to connect to the NI, and the other four groups of inputs and outputs can be configured to correspondingly connect to inputs and outputs of other routing nodes in north, south, east and west.

Regardless of specific quantities of the inputs and the outputs of the routing node and how the inputs and the outputs are arranged, in the present disclosure, the routing node includes a scheduling controller that generates an enabling signal for each input port and outputs the enabling signal to the input port. For example, in FIG. 2, the scheduling controller generates enabling signals EN1, EN2, EN3, EN4, and EN5 and sequentially provides them to the input port 1, the input port 2, input port 3, input port 4, and input port 5 respectively to control working statuses of the input ports, and realizes scheduling in combination with the scheduling method in the present disclosure. When one input port obtains a valid enabling signal and is enabled, the input port can normally receive a data packet and transmit the data packet to the routing node. When the input port obtains an invalid enabling signal and is not enabled, the input port does not receive data. Because the present disclosure focuses on the scheduling method for the input port, neither the present disclosure nor the accompanying drawings describe control of the scheduling controller over the output port in detail.

Based on such node structure of the routing node, according to a method executed by the scheduling controller, in a scheduling cycle, the scheduling controller enables each input port of the routing node sequentially according to a predetermined scheduling order, at most one input port is enabled at each time point, and the routing node receives a data packet through the enabled input port. Quantities of times at least two input ports are enabled are different in one scheduling cycle. For example, in FIG. 2, the input ports 1, 2, 3, and 4 are all enabled once in one scheduling cycle, while the input port 5 is enabled twice in one scheduling cycle. For another example, the input ports 1, 3, and 4 are all enabled once in one scheduling cycle, while the input port 5 is enabled twice in one scheduling cycle one scheduling cycle, and the input port 2 is enabled three times in one scheduling cycle.

The predetermined scheduling order may be customized. Generally, one input port is not continuously enabled, in other words, one input port is spaced by another input port in the predetermined scheduling order. This is because a data packet of each input port is uncertain and unpredictable in terms of time. After the input port 1 has transmitted all data packets, enabling the input port 1 again according to the predetermined scheduling order cannot achieve effective data reception. In addition, the predetermined scheduling order also needs to consider waiting time of each input port.

A specific quantity of times each input port is enabled may be customized and coordinated. However, no matter how many times each input port is enabled, there certainly is a difference between quantities of times various input ports are enabled in one scheduling cycle. That is, the present disclosure is different from a conventional approach in which each input port is enabled fairly and sequentially through rotation traversal. In the present disclosure, each input port of the routing node is not equally important but is biased. A larger quantity of times an input port is enabled in one scheduling cycle means that the routing node more tends to receive data from the input port and a frequency of receiving data from the input port is higher.

Therefore, higher communication importance of an input port leads to a larger quantity of times the input port is enabled in one scheduling cycle, and communication importance of the input port is related to a functional module connected to the input port and/or information transmitted by the input port. (1) A relationship between the functional module connected to the input port and the communication importance is described as follows. Communication importance of the input port connected to different functional modules may be pre-defined. In an implementation, there are some special functional modules in the FPGA, which are often functional modules with high communication requirements, such as a high-speed serial port. When the input port is not connected to these special functional modules, the input port has basic communication importance. When the input port is connected to these special functional modules, the input port has communication importance higher than the basic communication importance. (2) A relationship between the information transmitted by the input port and the communication importance is described as follows. The communication importance of the input port is related to at least one of a type, a transmission rate, a throughput, a load, and a latency requirement of the information transmitted by the input port. Communication importance of the input port for transmitting different types of information may be pre-defined. In an implementation, there is some special high-priority information. When the input port is not used to transmit this type of information, the input port has the basic communication importance; when the input port is used to transmit this type of information, the input port has the communication importance higher than the basic communication importance. Common special high-priority information includes, for example, alarm information used to indicate an abnormal system operation, and a signal for implement a quality of service (QoS) function. In addition, a higher transmission rate and/or a larger throughput and/or a larger load and/or a higher latency requirement of the information lead/leads to higher communication importance of the input port. The above separately describes impacts of the functional module connected to the input port and the information transmitted by the input port on the communication importance of the input port. Actually, these two parts can consider communication importance of each input port by combining a plurality of indicators. A corresponding method is similar. Selection of an indicator type and how to comprehensively determine the communication importance of each input port may be set based on actual needs.

Figure 3:
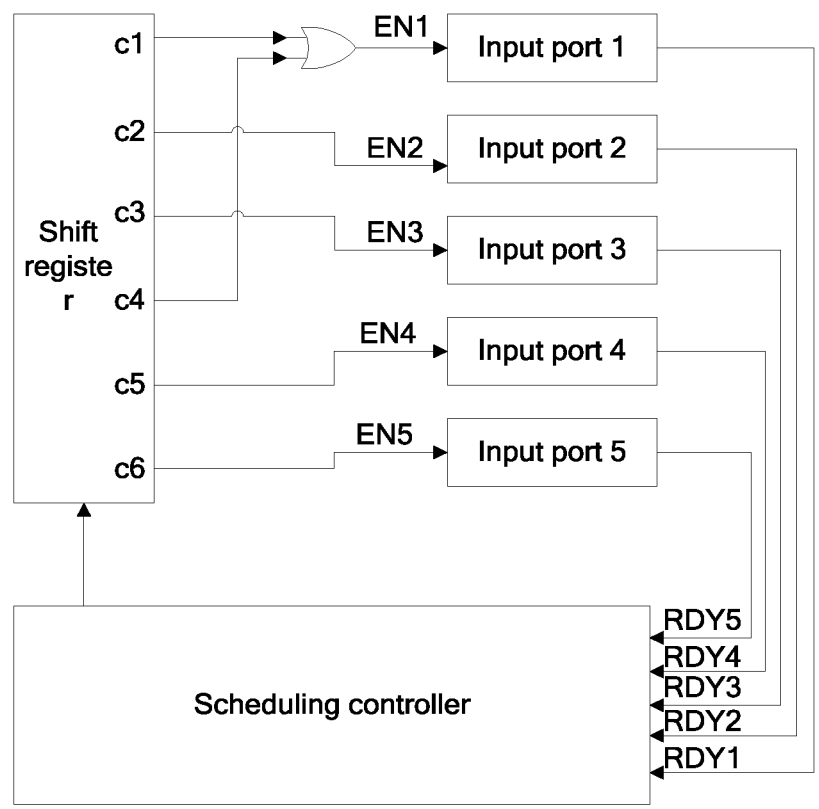
FIG. 3 is a schematic diagram of internal control of a routing node according to another embodiment.

In an embodiment, each input port also provides a feedback signal for the scheduling controller. For example, based on the structure shown in FIG. 2, as shown in FIG. 3, the input ports 1 to 5 also sequentially provide feedback signals RDY1 to RDY5 for the scheduling controller respectively. A valid feedback signal is provided for the scheduling controller when there is a data packet to be transmitted at the input port; or an invalid feedback signal is provided for the scheduling controller when there is no data packet to be transmitted at the input port. After data reception is completed through a currently enabled $i^{th}$ input port, the scheduling controller does not directly enable an $(i+1)^{th}$ input port, which is a next input port of the $i^{th}$ input port in the scheduled scheduling order. Instead, the scheduling controller provides a valid enabling signal for the $(i+1)^{th}$ input port to enable the $(i+1)^{th}$ input port only when a valid feedback signal of the $(i+1)^{th}$ input port is detected, such that the routing node receives a data packet through the $(i+1)^{th}$ input port. If an invalid feedback signal of the $(i+1)^{th}$ input port is detected, it means that there is no data packet to be transmitted at the $(i+1)^{th}$ input port. In this case, even if the $(i+1)^{th}$ input port is enabled, valid data reception cannot be performed. Therefore, the scheduling controller directly skips the $(i+1)^{th}$ input port, and enables an $(i+2)^{th}$ input port when a valid feedback signal of a next input port, namely, the $(i+2)^{th}$ input port, in the predetermined scheduling order is detected. Otherwise, the scheduling controller continues to skip to a next input port in the predetermined scheduling order, namely, an $(i+3)^{th}$ input port, and repeats the above process.

After receiving a data packet at a same input port, the routing node can directly output the data packet through a corresponding output port to achieve information forwarding. However, in order to balance a data transmission rate and a data reception rate, as shown in FIG. 2 and FIG. 3, the routing node internally includes a built-in memory, and all input ports are connected to the built-in memory to store received data packets in the built-in memory. All output ports are connected to the built-in memory, and a data packet in the built-in memory is output through the output port. In the NOC of the FPGA, built-in memories of various routing nodes have a same storage capacity, or built-in memories of at least two routing nodes have different storage capacities. For example, a built-in memory of one routing node can accommodate two data packets, while a built-in memory of another routing node can accommodate four data packets.

Therefore, in the embodiment shown in FIG. 2, the scheduling controller does not directly enable the next input port according to the predetermined scheduling order, but enables the next input port according to the predetermined scheduling order to receive the data packet when detecting that the built-in memory is not full. When detecting that the built-in memory is full, the scheduling controller pauses enabling of any input port, and enables the next input port according to the predetermined scheduling order to receive the data packet when the built-in memory of the routing node has a remaining storage capacity. This is similar in the embodiment shown in FIG. 3, and details are not described in the present disclosure again.

When the built-in memory is not full, the scheduling controller enables the next input port according to the predetermined scheduling order. In this case, the routing node receives the data packet through this input port. In an embodiment, the routing node receives one data packet through the enabled input port and stores the data packet in the built-in memory. In another embodiment, the routing node receives a plurality of data packets through the enabled input port under a constraint of the remaining storage capacity of the built-in memory, and stores the plurality of data packets in the built-in memory. This means that a plurality of data packets can be received at a time, only provided that the remaining storage capacity of the built-in memory can accommodate these data packets.

In an embodiment, each input port of the routing node is enabled at least once in one scheduling cycle. Alternatively, in another embodiment, at least one input port of the routing node is never enabled in the scheduling cycle. That is, an enabling signal of the corresponding input port may always be set to invalid to disconnect one or more input ports, to achieve flow control or preferential transmission. A decision of a network node on disconnecting an input port may be globally controlled by an upper layer or generated internally by the network node. At least one routing node in the NOC has a constantly disconnected input port. Further, if all or a part of circuits within the routing node are composed of reconfigurable logic, a dynamic reconfigurable function based on the FPGA can achieve constant disconnection of the input port online without pausing a network system.

In an embodiment, as shown in FIG. 3, the scheduling process enabled by the scheduling controller according to the predetermined scheduling order can be achieved by using a shift register. In this case, the routing node further includes the shift register, and the scheduling controller connects and controls the shift register to output a shift control signal that includes Q control bits. Each of the control bits corresponds to one input port, and one input port corresponds to at least one control bit. A quantity of control bits corresponding to one input port is positively correlated with a quantity of times the input port is enabled in one scheduling cycle, and an order of a control bit corresponding to one input port in all the Q control bits matches the predetermined scheduling order. One control bit uniquely corresponding to one input port is directly output as an enabling signal of the input port; and a plurality of control bits corresponding to a same input port are used as an enabling signal of the corresponding input port after undergoing OR processing.

In an example shown in FIG. 3, it is assumed that the predetermined scheduling order is: input port 1→input port 2→input port 3→input port 1→input port 4→input port 5. If the input port 1 is enabled twice in one scheduling cycle, and all other input ports are enabled once, a quantity of control bits corresponding to the input port 1 should be greater than quantities of control bits corresponding to the other input ports. For example, if the shift control signal output by the shift register includes 6 control bits c1 to c6, the input port 1 corresponds to two control bits, namely, c1 and c4, and the other input ports each correspond to one control bit. One control bit c2 uniquely corresponding to the input port 2 is directly output as the enabling signal EN2 of the input port 2. Similarly, the same applies to the input ports 3, 4, and 5. The control bits c1 and c4 corresponding to the same input port 1 need to be output as the enabling signal EN1 of the input port 1 after undergoing the OR processing. In addition, due to a fixed shift order of the shift control signal output by the shift register, for example, a first output, a shifted output, and a re-shifted output of the control bits c1 to c6 of the shift control signal are 100000, 010000, and 001000 respectively. Therefore, in order to ensure that a required input port is enabled after the shift control signal is shifted, an order of a control bit corresponding to each input port in all the Q control bits needs to match the predetermined scheduling order. The number of the control bit is a position of the control bit in the shift control signal. In the example shown in FIG. 3, the input port 1 corresponds to the first control bit c1 and the fourth control bit c4, the input port 2 corresponds to the second control bit c2, the input port 3 corresponds to the third control bit c3, the input port 4 corresponds to the fifth control bit c5, and the input port 5 corresponds to the sixth control bit c6. Therefore, the predetermined scheduling order can be achieved only by shifting the shift control signal. The scheduling controller can enable the next input port by controlling the shift control signal output by the shift register to be shifted by one bit, and can skip the next input port and directly enable a next input port of the skipped input port by controlling the shift control signal to be shifted by two bits.

As mentioned above, the input port of the routing node is biased, and a larger quantity of times the input port is enabled leads to a larger bias of the input port. From a global perspective, biased input ports within different routing nodes in the NOC are located on a same signal transmission path in the FPGA, and a biased input port within each routing node is an input port with a non-smallest quantity of enabling times within the routing node. That is, one signal transmission path has a large bias when passing through a plurality of routing nodes, which can form a preferred path in the NOC. This can improve communication efficiency of the one signal transmission path, and meet communication requirements of some special paths, such as a path for realizing a QoR service (time-limited preferential transmission).

In terms of a time dimension, predetermined scheduling orders followed by the scheduling controller within one routing node in two adjacent scheduling cycles are the same or different. That is, the predetermined scheduling order of the scheduling controller within the routing node may be changed, such that the predetermined scheduling order can be dynamically adjusted based on a change of a network load or a data volume of each input port, to achieve different biases and meet needs of different scenarios. Further, if all or a part of the circuits within the routing node are composed of the reconfigurable logic, the scheduling controller updates the predetermined scheduling order online based on the dynamic reconfigurable function of the FPGA, which means that the predetermined scheduling order can be changed online without disconnecting the network. In a typical application scenario, the network generally has a load monitoring and regulation capability. When a specific node is often blocked, the upper layer can perform intervention to change the predetermined scheduling order to achieve load balancing and improve overall efficiency of the network. In another scenario, when the functional module connected to the routing node completes a specific task or executes different tasks, a data volume at the input port of the routing node changes. In this case, a network manager can adjust the predetermined scheduling order of the routing node based on a newly assigned task.

In theory, the predetermined scheduling order followed by each network node is generally controlled globally by the upper layer. In other words, the upper layer implements centralized control over each network node, which is easy to implement, and can provide some specific functions such as the QoR service (time-limited preferential transmission) through global coordination. However, in an embodiment, the predetermined scheduling order followed by each network node may alternatively be controlled locally by the network node itself. In other words, each network node is controlled in a distributed manner, which is more elastic and easy to expand.

What is claimed is:

1. A routing node scheduling method for a network on chip (NOC) in a field programmable gate array (FPGA), wherein a routing node in the NOC comprises a scheduling controller, and a method executed by the scheduling controller comprises: in a scheduling cycle, enabling, by the scheduling controller, each input port of the routing node sequentially according to a predetermined scheduling order, wherein at most one input port is enabled at each time point; and receiving, by the routing node, a data packet through the enabled input port, wherein quantities of times at least two input ports are enabled are different in one scheduling cycle; wherein higher communication importance of the input port leads to a larger quantity of times the input port is enabled in one scheduling cycle, and communication importance of the input port is related to a functional module connected to the input port and/or information transmitted by the input port.

2. The routing node scheduling method according to claim 1, wherein the communication importance of the input port is related to at least one of a type, a transmission rate, a throughput, a load, and a latency requirement of the information transmitted by the input port.

3. The routing node scheduling method according to claim 1, wherein predetermined scheduling orders followed by the scheduling controller within one routing node in two adjacent scheduling cycles are same or different.

4. The routing node scheduling method according to claim 3, wherein the scheduling controller updates the predetermined scheduling order online based on a dynamic reconfigurable function of the FPGA.

5. The routing node scheduling method according to claim 1, wherein biased input ports within different routing nodes in the NOC are located on a same signal transmission path in the FPGA, and a biased input port within each routing node is an input port with a non-smallest quantity of enabling times within the routing node.

6. The routing node scheduling method according to claim 1, wherein each input port of the routing node is enabled at least once in one scheduling cycle, or at least one input port of the routing node is never enabled in the scheduling cycle.

7. The routing node scheduling method according to claim 1, wherein after the routing node completes data packet reception through a currently enabled $i^{th}$ input port, when the scheduling controller detects a valid feedback signal of an $(i+1)^{th}$ input port, the scheduling controller enables the $(i+1)^{th}$ input port, and the routing node receives a data packet through the enabled $(i+1)^{th}$ input port; when the scheduling controller detects an invalid feedback signal of the $(i+1)^{th}$ input port, the scheduling controller skips the $(i+1)^{th}$ input port and detects a feedback signal of an $(i+2)^{th}$ input port, wherein the $(i+1)^{th}$ input port is a next input port of the $i^{th}$ input port in the predetermined scheduling order, the $(i+2)^{th}$ input port is a next input port of the $(i+1)^{th}$ input port in the predetermined scheduling order, the valid feedback signal is a feedback signal when there is a data packet to be transmitted at the input port, and the invalid feedback signal is a feedback signal when there is no data packet to be transmitted at the input port.

8. The routing node scheduling method according to claim 1, wherein the routing node comprises a built-in memory, and when detecting that the built-in memory is not full, the scheduling controller enables a next input port according to the predetermined scheduling order to receive a data packet; or when detecting that the built-in memory is full, the scheduling controller pauses enabling of any input port, and enables a next input port according to the predetermined scheduling order to receive a data packet when the built-in memory has a remaining storage capacity.

9. The routing node scheduling method according to claim 8, wherein the routing node receives one data packet through the enabled input port and stores the data packet in the built-in memory, or the routing node receives a plurality of data packets through the enabled input port under a constraint of the remaining storage capacity of the built-in memory and stores the plurality of data packets in the built-in memory.

10. The routing node scheduling method according to claim 8, wherein built-in memories within any two routing nodes in the NOC have a same capacity or different capacities.

11. The routing node scheduling method according to claim 1, wherein the routing node further comprises a shift register, and the scheduling controller connects and controls the shift register to output a shift control signal comprising Q control bits, each of the control bits corresponds to one input port, and one input port corresponds to at least one control bit; a quantity of control bits corresponding to one input port is positively correlated with a quantity of times the input port is enabled in one scheduling cycle, and an order of a control bit corresponding to one input port in all the Q control bits matches the predetermined scheduling order; one control bit uniquely corresponding to one input port is directly output as an enabling signal of the input port; and a plurality of control bits corresponding to a same input port are used as an enabling signal of the corresponding input port after undergoing OR processing.

* * * * *